United States Patent [19]

Spulgis et al.

[11] 4,076,057
[45] Feb. 28, 1978

[54] METHODS FOR FILLING FILTER CELLS WITH ADSORBENT MATERIAL

[75] Inventors: Ivars Sigurds Spulgis; Jack Leland Pettit; Michael Duane Allard, all of Columbus; Harold Cheney Parish, Upper Arlington, all of Ohio

[73] Assignee: Pennwalt Corporation, Philadelphia, Pa.

[21] Appl. No.: 673,840

[22] Filed: Apr. 5, 1976

Related U.S. Application Data

[62] Division of Ser. No. 572,580, Apr. 28, 1975, Pat. No. 4,030,639.

[51] Int. Cl.² ............................................. B65B 3/00
[52] U.S. Cl. ........................................ 141/1; 210/455

[58] Field of Search ............... 210/455, 464, 465, 473, 210/475, 1; 141/1, 286, 231, 331–345, 297, 298, 299, 300, 199–205

[56] References Cited

U.S. PATENT DOCUMENTS

1,790,947    2/1931    Rabjoan et al. ..................... 141/286

Primary Examiner—Houston S. Bell, Jr.
Attorney, Agent, or Firm—Charles N. Quinn

[57] ABSTRACT

Methods are provided for filling adsorber filter cells with particulate granular adsorbent material from above the filter cells. The methods produce a substantially uniform packing density of particulate material in the cells without the necessity of vibrating the cells.

9 Claims, 16 Drawing Figures

METHODS FOR FILLING FILTER CELLS WITH ADSORBENT MATERIAL

CROSS REFERENCE TO RELATED PATENT APPLICATION

This patent application is a division of previously copending United States patent application Ser. No. 572,580, now U.S. Pat. 4,030, 639 entitled "Charcoal Adsorber Filter Fill System", filed Apr. 28, 1975.

BACKGROUND OF THE INVENTION

1. Field of the Invention

The present invention is in the field of filling receivers with granular material and more particularly in the field of filling charcoal adsorber filters with granular charcoal. Specifically, the present invention relates to methods for filling a filter with granular charcoal, from above the filter, in a fashion to achieve a substantially uniform packing density of granular charcoal within the filter. The methods are designed to be used in conjunction with vertically oriented adsorber filter cells, to achieve uniform packing density within such cells, thereby avoiding channeling effects.

2. Description of the Prior Art

Apparatus for dispensing granular materials and for filling containers with granular materials have long been known and a variety of such apparatus has been used to perform these tasks. Typical of these devices are the apparatus shown in U.S. Pat. Nos. 117,718, 335,709 and 2,511,089.

With evolving technology, the need has arisen for more sophisticated apparatus and for methods for packing granular material in a substantially uniform fashion within a hopper, filter or other structure. This requirement is particularly acute in air filter systems which use adsorbers for filtering radioactive materials from the air at a nuclear power plant.

The United States Nuclear Regulatory Commission has issued Regulatory Guides which set forth general design criteria for the design of nuclear power plants and the allied equipment required therefor. One key system for nuclear power plant is an atmospheric clean-up system for which general design guidelines are given in NRC Regulatory Guide 1.52. As an integral part of the atmospheric clean-up system at least one adsorption unit is required for adsorbing radioactive materials from the air after an accident. Adsorption units are manufactured in a variety of configurations, one of which is described in pending U. S. Pat. No. 3,964,890. Another configuration is shown in U.S. Pat. No. 3,925,046. These units require the adsorber filter to be filled with adsorbent material, preferably charcoal, from above the unit and that filling result in a substantially uniform density of adsorbent within the adsorber filter. This prevents "channeling" whereby paths of low resistance are available for air passing through the adsorber unit. Channeling is undesirable since air, to be properly filtered, must spend sufficient time in residence in the adsorber cell so that radioactive waste in the air can be adsorbed by charcoal. Cells with channeling do not produce satisfactory residence time for air passing therethrough and consequently the air is not sufficiently purified.

In the past, it was thought that by vibrating an adsorber unit filled with granular charcoal, charcoal settling would occur thereby minimizing channeling. In fact, vibration of a filled cell of the adsorber apparatus may result in aggravating the channeling problem due to vibrational nodes in the cell structure with consequent non-uniform vibration of the adsorber unit and charcoal therein.

Experiments have shown that the methods of the present invention not only provide a uniform packing density of charcoal adsorbent when utilized to fill a charcoal adsorber cell, but also acheive greater packing density than achieved by vibrating the cell. Such greater packing density enhances cell performance and has a further advantage in that by increasing flow resistance through the adsorber cell, flow irregularity, due to possible entrance and exit effects where air enters and leaves the cell, is also decreased. Most importantly, the methods produce very uniform packing of a charcoal adsorber cell. This results in uniform flow resistance to air passing through the cell.

SUMMARY OF THE INVENTION

Heretofore, it has not been known to fill an adsorber cell with granular adsorbent in a manner whereby a substantially uniform density of granular material in the cell results without shaking or vibrating the cell. The present invention provides methods which overcome the aforementioned disadvantages and difficulties present in the prior art and which, when used, result in a substantially improved density and uniformity of filling.

In accordance with the foregoing, it is a principal object of the present invention to provide methods for filling an adsorber cell which provide a controlled fill rate for adsorbent filling the adsorber cell.

It is a further object of the present invention to provide methods for filling an adsorber cell which assure substantially uniform distribution and density of granular adsorbent within the adsorber cell.

It is a further object of the present invention to provide methods for filling an adsorber cell which may be utilized to fill one or more adsorber filter cells from above the cells to achieve maximum packing densities within the cells.

It is a further object of the present invention to accomplish the aforementioned objects without vibrating the adsorber cells during or after filling with adsorbent.

It is a further object of the present invention to provide methods for filling an adsorber cell which result in filling the cell in a way to minimize variations in air flow resistance through the adsorber cell.

These and other objects of the present invention will be apparent to those of ordinary skill in the art from an inspection of the attached drawing figures and from a reading of the following specification and the appended claims.

The present invention, in the preferred embodiment, solves the problems present in the prior art by providing methods for filling one or more charcoal adsorber cells, which result in optimum distribution of adsorbent in the adsorber cell.

BRIEF DESCRIPTION OF THE DRAWINGS

In the drawings, identical numbers represent parts having identical or substantially similar names and/or functions in different embodiments. Lower case alphabetic letters denote different embodiments.

DESCRIPTION OF THE PREFERRED EMBODIMENTS

Figure 1:
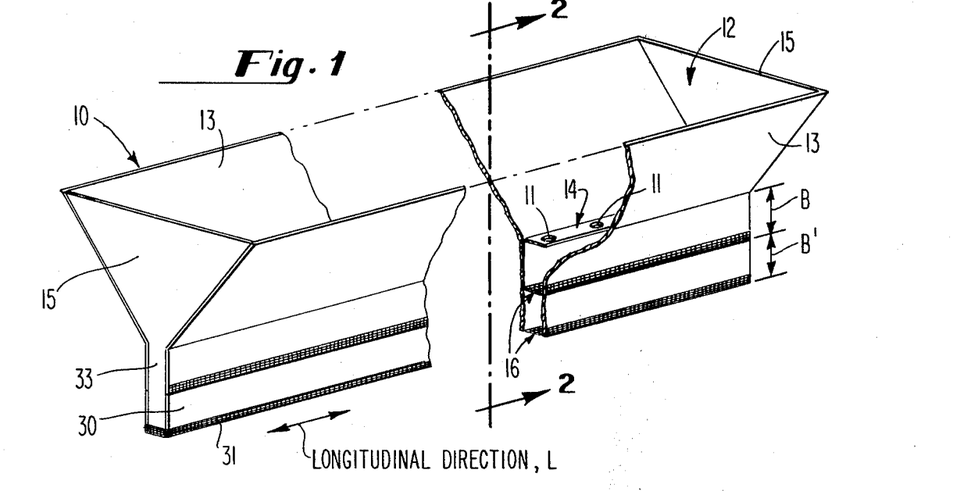
FIG. 1 is a broken-away isometric view of an apparatus for filling adsorber air filter cells with granular charcoal.

Reference is made to FIG. 1 which illustrates apparatus 10 for filling filter cells. A hopper designated 12 is provided for storing granular charcoal in the apparatus and comprises two end wall portions 15 and two side wall portions 13. The hopper is open at the top and has at its bottom a metering means 14 in the form of a plate with hole means 11 therethrough distributed longitudinally therealong. The longitudinal direction has been designated by arrow L. When the longitudinal direction is referred to, a direction lengthwise along apparatus 10 as shown by arrow L is understood. Located immediately below plate or metering means 14 is at least one distribution means 16. In the embodiment shown in FIG. 1, two distribution means 16 are illustrated, one directly below the other. Distribution means 16 is generally screen-like, and preferably is hardware cloth of suitable mesh size. The preferred mesh size characteristics of the distribution means are discussed hereinbelow. Extending below metering means 14 are side wall guide means 30 for guiding falling granules through distribution means 16. The side wall guide means either may be separate structures extending downwards from hopper 12 or may be extensions of hopper side walls 13. Similarly, end guide wall means 33 for guiding falling granules downwardly may be separate structures attached to end wall 15 or may be extensions of end wall 15 with end wall 15 and end wall guide means 33 being a single piece of material. Hole means 11 are disposed longitudinally along the metering or plate means 14 for passage therethrough of granules.

Figure 2:
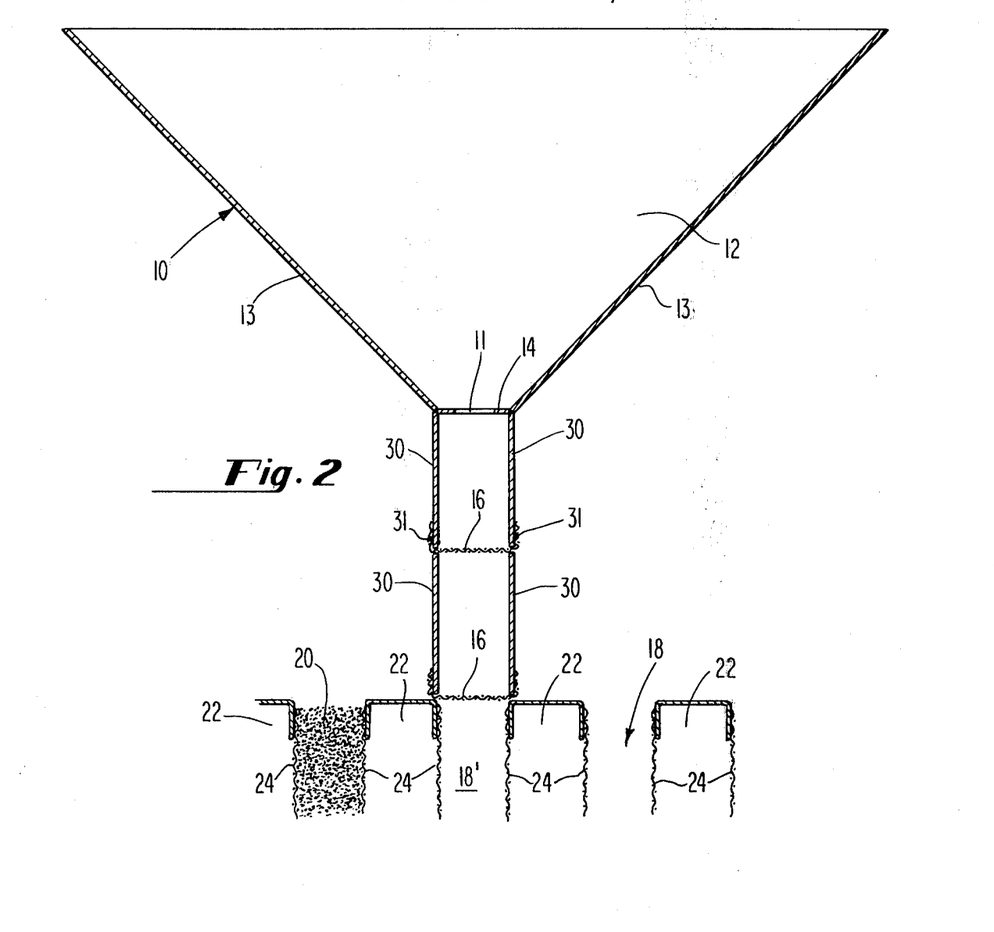
FIG. 2 is a sectional view taken along the lines and arrows 2—2 in FIG. 1, showing apparatus for filling a filter cell, above an empty cell.

FIG. 2 is a sectional view taken through a hole means 11 in metering or plate means 14. Visible in this section are side wall guide means 30 for guiding falling granules passing through hole means 11 and distribution means 16. In the construction shown in FIG. 2, the distribution means are tack-welded to side wall guide means 30; tack-welds are designated 31. In FIG. 2, several adsorber cells are depicted below apparatus 10 with a filled adsorber cell shown as 20 and with two empty filter cells 18 ready for receipt of granular charcoal. The apparatus 10 has been placed in position over empty adsorber cell 18', in contact therewith. The side walls of adsorber cells 20, 18 and 18' are mesh side walls 24. Solid end structures 26 form portions of air passageways 22 adjacent the adsorber cells. For a more detailed description of typical adsorber cells which the apparatus 10 invention might be used to fill, reference is made to U.S. Pat. No. 3,925,046, "Radioactive Gas Standby Treatment Apparatus with High Efficiency Rechargeable Charcoal Filter" and to U.S. Pat. No. 3,964,890, "Rechargeable Particulate Filter for Radioactive Contaminated Gas Streams".

Figure 3:
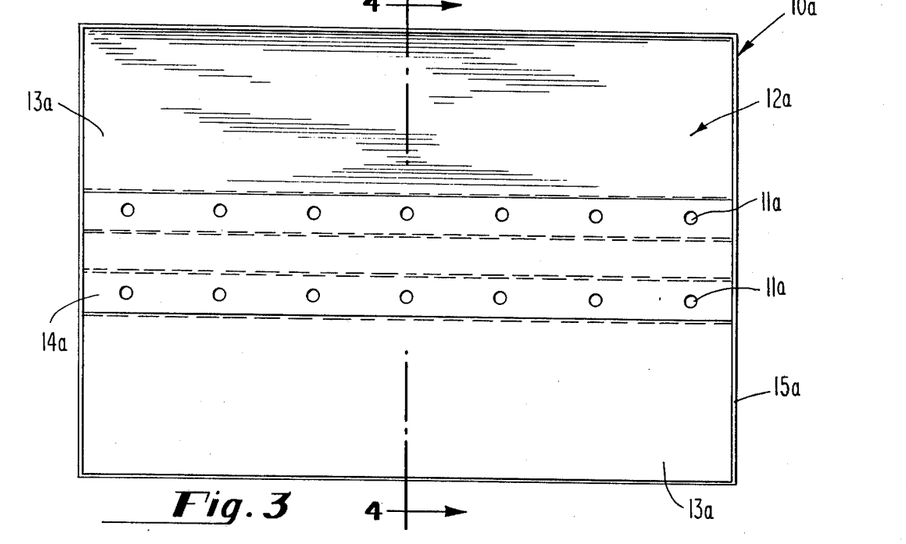
FIG. 3 is a top view of another embodiment of apparatus for filling charcoal adsorber filter cells. The embodiment shown in FIG. 3 is suitable for filling two filter cells simultaneously.

Reference is made to FIG. 3. Hopper or storage means for storing charcoal is shown as 12a with two metering means 14a having symmetrically distributed holes 11a for passage therethrough of granular charcoal. Hopper 12a has side walls 13a and end walls 15a and an open top for receipt of granular charcoal. In the apparatus shown in FIG. 3, the metering or plate means 14a comprises a single plate with two symmetrical groupings of holes 11a therein. Each set of holes is symmetrically spaced for filling two filter cells simultaneously. This arrangement is more clearly shown in FIG. 4.

In FIG. 4, again visible is hopper 12a with two side walls 13a and metering or plate means 14a having two sets of holes 11a therein. Plate means 14a is sufficiently wide to encompass the width of two adjacent filter cells plus the distance between the two cells. Dimensional figure X denotes the width of the filter cell to be filled and dimensional figure Z denotes the distance between adjacent filter cells. The two filling chutes, the downwardly projecting structures G, are comprised of side wall guide means 30a for guiding falling granules into the filter cells. At least one distribution means 16a is in each chute for distributing the granular charcoal uniformly.

Figure 4:
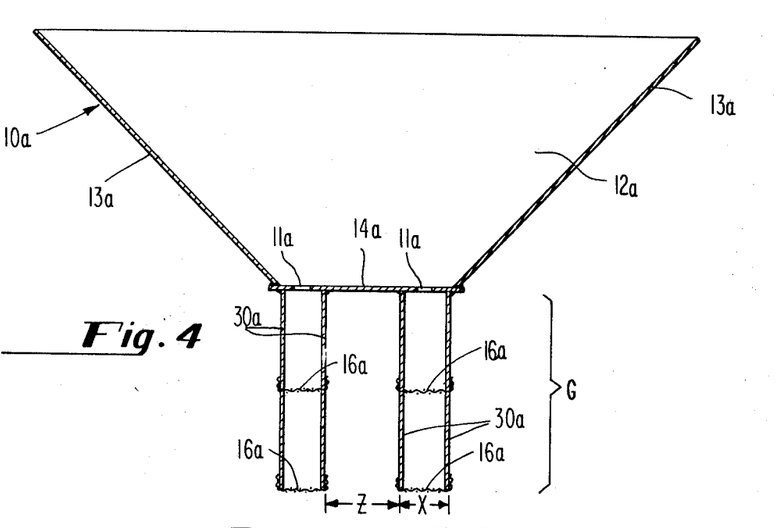
FIG. 4 is a sectional view of the apparatus shown in FIG. 3, with the section taken along the lines and arrows 4—4 in FIG. 3.
Figure 5:
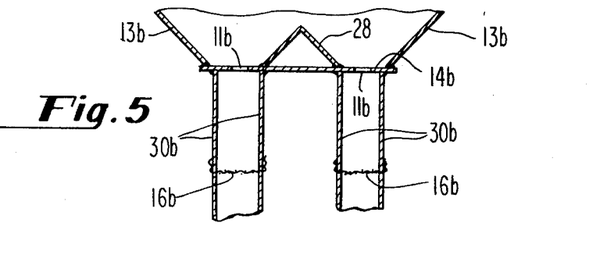
FIG. 5 is a broken-away sectional view of another embodiment of apparatus for filling filter cells, quite similar to the embodiment shown in FIG. 3. The section of FIG. 5 would be taken along the lines and arrows 4—4 in FIG. 3.

Reference is now made to FIG. 5. The fill apparatus shown in FIG. 5 is similar to that shown in FIG. 4 and in FIG. 3 with the addition of ramp means 28 to assure complete emptying of the hopper. In all respects other than presence of ramp means 28, the apparatus shown in FIG. 5 is substantially the same as shown in FIGS. 3 and 4.

Figure 6:
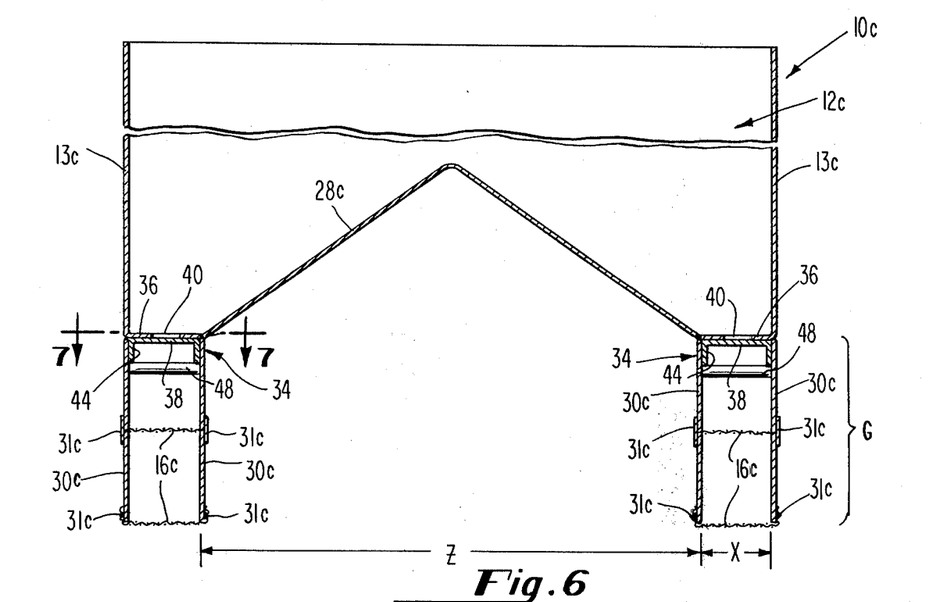
FIG. 6 is a sectional view of yet another embodiment of apparatus for filling filter cells, where the apparatus is for filling two filter cells at the same time.

FIG. 6 illustrates another embodiment of apparatus 10c for filling filter cells. The fill apparatus in FIG. 6 permits filling of one or two filter cells where the filter cells are width X and are separated by distance Z. The apparatus of FIG. 6 has hopper storage means 12c for storing the granular charcoal prior to release of charcoal into the filter cells; this hopper means has side walls 13c and bottom ramp means 28c to assure complete emptying. Side wall guide means 30c for guiding falling granules are provided as are distribution means 16c secured to the side wall guide means by suitable means 31c. Two distribution means 16c are illustrated in each filling chute; the chute means are again designated G. The embodiment shown in FIG. 6 includes two gate means 34 for optionally selectably permitting and preventing flow of granular adsorbent downward through delivery chutes G formed by side walls 30c. Gate means 34 are made up of first plate means 36 having a plurality of holes 40 therein spaced longitudinally, second plate means 38 which has a similar plurality of holes 42 therein spaced longitudinally and support means 48 for supporting the gate means and more specifically for supporting second plate means 38 of the gate means. The gate means is designed so the second plate means can move longitudinally on support means 48. The gate means are disposed for movement between two positions, a first position where the gate means is open and hole means 40 are aligned with hole means 42 so charcoal can flow out of filler hopper 12c, and a second position where the gate means is closed, holes 40 are not aligned with holes 42 thereby not permitting charcoal to flow from hopper 12c through the delivery chutes. Operation of the gate means will be understood fully upon study of FIGS. 7, 8 and 9, discussed below. It will be noted in connection with FIG. 6 that second plate means 38 of gate means 34 is an inverted generally U-shaped channel, supported on support means 48.

Figure 7:
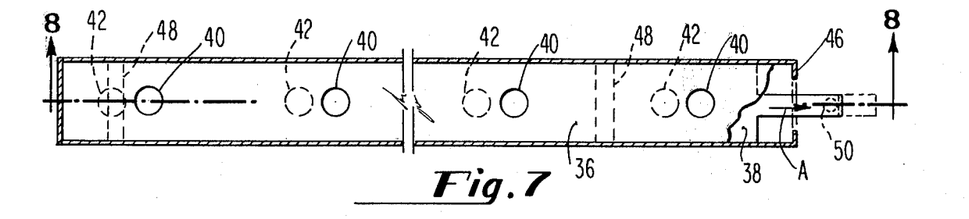
FIG. 7 is a broken sectional view taken along the lines and arrows 7—7 of FIG. 6 showing a portion of a gate means.
Figure 8:
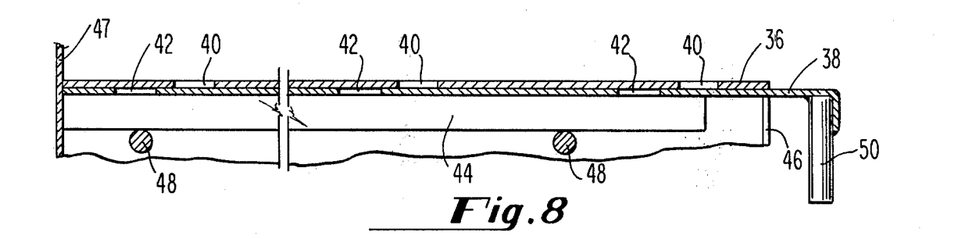
FIG. 8 is a partial, broken sectional view of a portion of the apparatus of FIG. 6, taken along the lines and arrows 8—8 of FIG. 7, showing a gate means in a position where no charcoal is allowed to flow.
Figure 9:
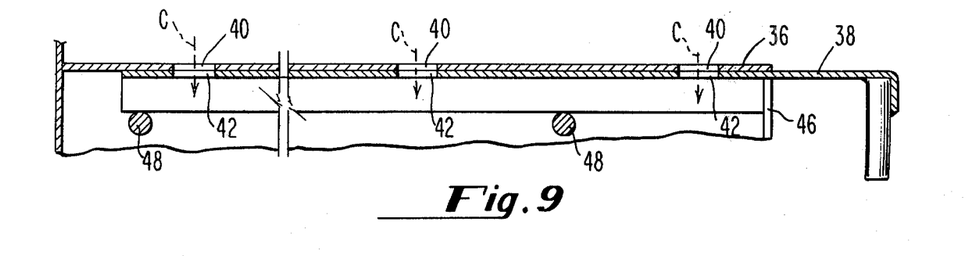
FIG. 9 is a partial, broken sectional view of the apparatus of FIG. 6, taken along the lines and arrows 8—8 of FIG. 7, showing a gate means in a position where charcoal may flow.

Reference is now made to FIGS. 7, 8 and 9. In FIG. 7, the gate means has been depicted in solid line at its second or closed position at which charcoal cannot flow through holes 40 and 42, since these sets of holes are not aligned. Phantom lines depict the position of second plate means 38 whereby holes 40 and 42 are in alignment, after the second plate means has moved to the right, in the direction shown by arrow A, thereby permitting flow of granular adsorbent downward out of the hopper. Metering or first plate means 36 remains stationary at all times; only second plate means 38 moves. Movement of second plate means 38 is between two positions, shown in FIGS. 8 and 9.

In FIG. 8, support means 48 for second plate means 38 are clearly shown as are holes 40 in first plate means 36 and holes 42 in second plate means 38. Handle 50 is for manually moving the gate means between first and second positions. Side portions 44 of the second plate means, which form the U-shape of the channel, act in conjunction with first and second end stop means 46 and 47 to define end limits of travel for second plate means 38. When second plate means 38 is at the position shown in FIG. 8, the end of side portion 44 abuts second end stop means 47 and additional movement of the second plate means to the left in FIG. 8 is effectively prevented. Likewise, once second plate means 38 is moved to the right, to the first or open position whereby the holes are aligned and charcoal can flow, as shown in FIG. 9, the opposite end of side portion 44 of second plate means 34 abuts first end stop 46 thereby limiting travel of the second plate means to the right.

Construction of support means 48 and first and second plate means 36 and 38 in the embodiment shown in FIGS. 6, 7, 8 and 9 is made with dimensions whereby first and second plate means 36 and 38 are substantially flush with one another, so that when the second plate means is in the second or closed position, a substantially air-tight seal is affected between the two plates and substantially no air can enter hopper 12c through holes 40.

Figures 10, 11:
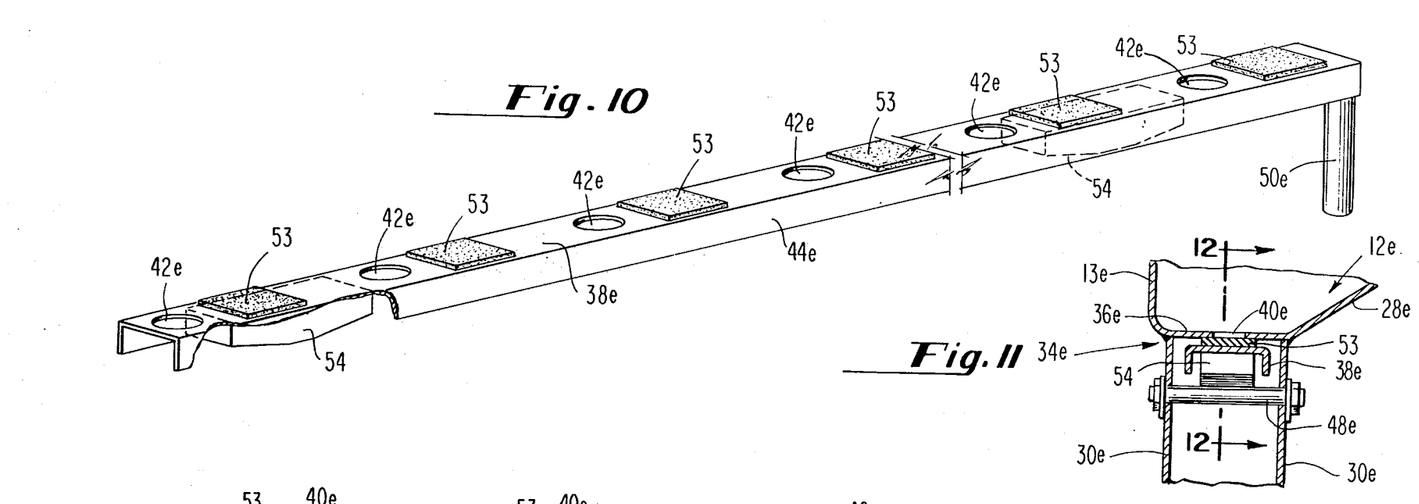
FIG. 10 is a partial, broken isometric view of a portion of another embodiment of a gate means for regulating flow of charcoal out of the apparatus.
FIG. 11 is a partial, sectional view of the embodiment of gate means for controlling flow of charcoal shown in FIG. 10.

In FIG. 10, there is shown the generally inverted U-shaped channel which comprises second plate means 38e having side portion 44e where the second plate means has been broken away to show camming means 54. Camming means 54 operates in conjunction with support means for second plate means 48e, as will be seen more clearly in FIGS. 11, 12, 12A, to provide vertical motion of the second plate means whenever the second plate means is moved horizontally between the first or open and second or closed positions. FIG. 10 also shows sealing pad means 53 positioned along second plate means 38e for affecting air-tight seals at holes 40e in the first plate means when the second plate means is at the second or closed position. Sealing pad means 53 preferably are made of a slightly deformable material, such as hard rubber, to affect the air-tight seal when in closed disposition with holes 40e. Handle means 50e is provided for moving second plate means 38e between the first or open and second or closed positions; any suitable power means could be supplied to move the second plate means between the two positions.

Reference is made to FIG. 11. Hopper 12e has side wall 13e and ramp means 28e to assure substantially complete emptying of the hopper when charcoal granules flow through the chute means due to gate means 34e being at the first or open position. The hopper has first plate means 36e with holes 40e therethrough where first plate means 38e forms a portion of gate means 34e. Second plate means 38e has caming means 54 attached thereto at the lower side or lower surface, and also has attached at the upper surface sealing pad means 53. Second plate means 38e either is supported on support means 48e by camming means 54 or rests directly on support means 48e. The delivery chute area is formed by two side wall guide means 30e.

Figure 12:
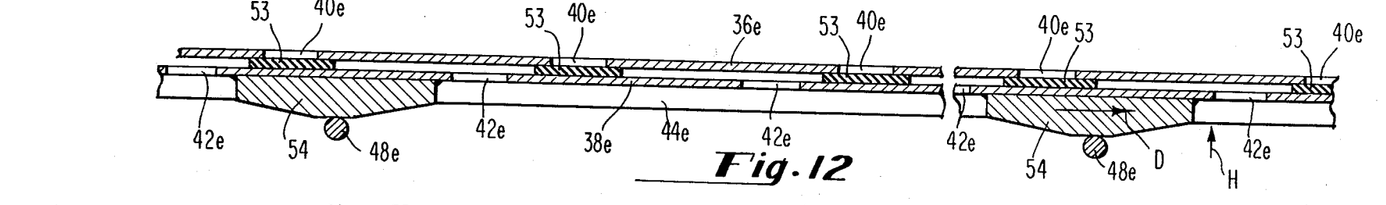
FIG. 12 is a partial, sectional view taken along the lines and arrows 12—12 of FIG. 11, showing two plate means in position whereby no charcoal can flow out of the apparatus.
Figure 12A:
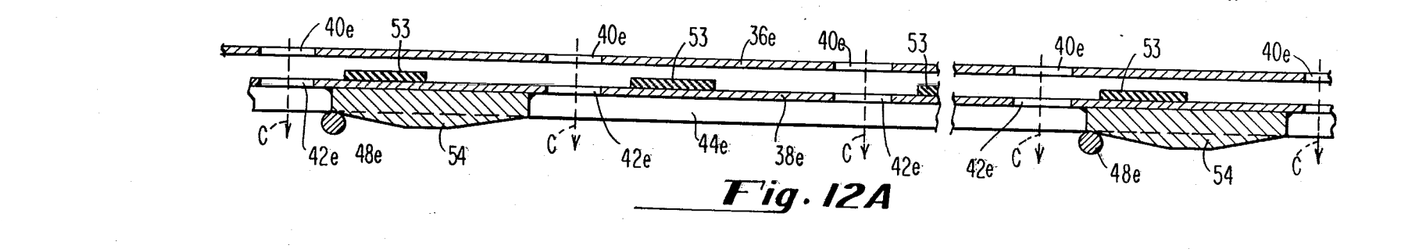
FIG. 12A shows the two plate means in position whereby charcoal can flow out of the apparatus.

Reference is made to FIGS. 12 and 12A. In FIG. 12 second plate means 38e has camming means 54 located on the bottom surface thereof and sealing pad means 53 in abutted disposition with holes 40e in first plate means 36e. Arrow D denotes the direction second plate means 38e travels when it is moved from the second or closed position shown in FIG. 12 to the first or open position shown in FIG. 12A. The sealing pads are preferably a slightly deformable material so that when the second plate means is in the position shown in FIG. 12, an upward force in direction H is created on the second plate means, due to the camming action of camming means 54 in conjunction with support means 48e, thereby forcing the sealing pad means into a slightly compressed disposition about the periphery of holes 40e. One sealing pad means is positioned for sealing each hole 40e spaced longitudinally along first plate means 36e. Similarly, holes 42e are suitably spaced for communicating disposition with corresponding holes 40e, for passage therethrough of granular charcoal. When the first and second plate means are in the positions shown in FIG. 12A, so charcoal can flow through holes 40e and 42e as shown by arrows C, holes 40e and 42e are in communicating disposition or communicating relation. In FIG. 12A, the second plate means has been moved to the right, relative to the position shown in FIG. 12, such that due to camming action of camming means 54 against support means 48e, holes 40e and 42e are not only aligned but second plate means 38e has assumed a lower disposition, further away from first plate means 36e. Once second plate means 38e has reached the position shown in FIG. 12A, whereby the second plate means either is supported directly by support means 48 or only a small portion of camming means 54 is between support means 48 and the second plate means, charcoal can fall through the communicating holes and movement of second plate means 38e is complete. Suitable stop means, such as shown in FIGS. 8 and 9 as 44, 46, and 47 may be utilized in conjunction with the apparatus shown in FIGS. 10, 11, 12 and 12A. The configuration of the sealing pad means is not limited to that shown in FIGS. 10, 11, 12 and 12A; any suitable configuration may be used.

Figure 13:
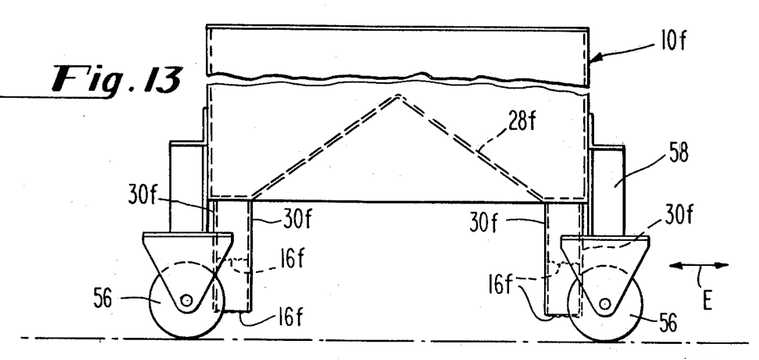
FIG. 13 is a broken, partial sectional view of apparatus for filling charcoal adsorber filter cells shown in FIG. 6, fitted with wheel means to facilitate movement along the tops of the filter cells.

Reference is made to FIG. 13 where there is shown apparatus similar to that shown in FIG. 6, designated generally as 10f, equipped with wheel means and wheel means mounting frames to facilitate carriage of the apparatus along direction E. Distribution means 16f, side wall guide means 30f for guiding falling granules and ramp means 28f are substantially the same as those described for previous embodiments. Wheel means 56 and wheel means mounting frame 58 allow apparatus 10f to be easily moved along the top of adjacent filter cells.

Figure 14:
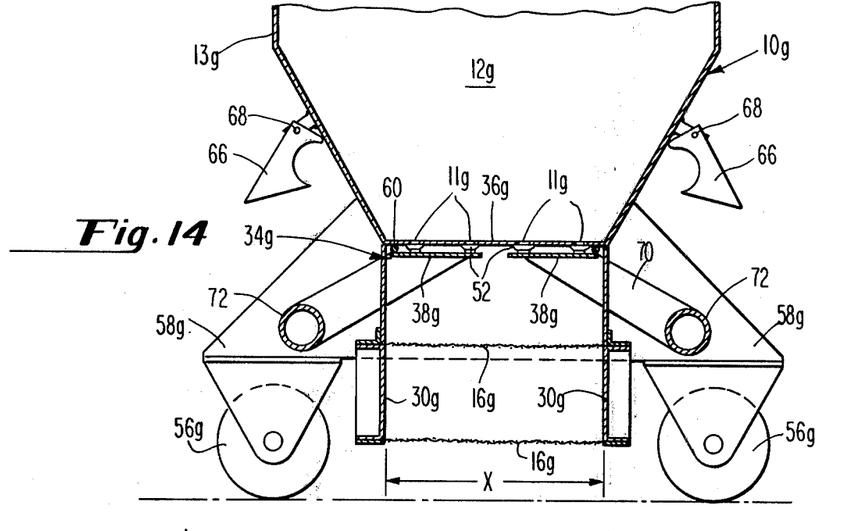
FIG. 14 is a partial sectional view of yet another embodiment of apparatus for filling filter cells, with wheel means to facilitate movement of the apparatus along the tops of filter cells to be filled, and which employs a hinged gate means to control flow of adsorbent out of the apparatus.

FIG. 14 illustrates another apparatus for filling filter cells, designated 10g. Hopper 12g has side walls 13g and a bottom portion comprised partly of metering or first plate means 36g. First plate means 36g has a plurality of symmetrically spaced holes 11g for passage therethrough of granular charcoal. Gate means 34g are disposed for pivoting about hinge means 60 between first or open and second or closed positions. The embodiment is shown in FIG. 14 in a closed position where both second plate means 38g have been pivoted about hinge 60 so sealing cap means 52 have effectively sealed holes 11g. Gate means 34g not only comprises second plate means 38g, first plate means 38g, and sealing cap means 52, but also connecting arm 70 connected to ratchet mate means 72 and disposed for optional engagement with swinging ratchet 66 mounted from ratchet hinge 68.

In FIG. 14, the width of the filter cell has again been designated X. The embodiment shown in FIG. 14 utilizes four rows of holes 11g to fill the filter cell. As in previous embodiments, at least one distribution means 16g is disposed below first plate or metering means 36g; side wall guide means 30g are also provided for guiding the granules downward. The hopper is again mounted on wheel means 56g by wheel mounting frame means 58g. Although the apparatus in FIG. 14 has two separate hinged second plate means 38g, the apparatus could be constructed with only a single hinged second plate means and with only one or two rows of holes for distributing the granules.

Figure 15:
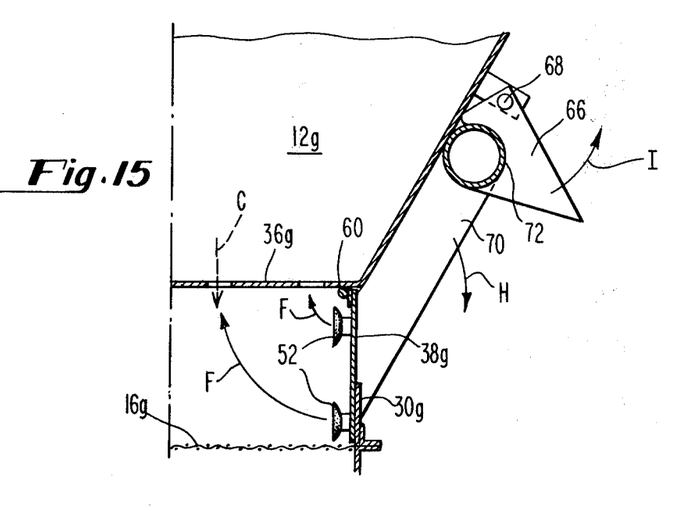
FIG. 15 is a partial broken sectional view of apparatus for filling filter cells of FIG. 14, showing the gate means used to regulate flow of charcoal out of the apparatus in position whereby charcoal is permitted to flow downward.

FIG. 15 shows a second plate means 38g moved to the first or open position. Second plate means 38g, sealing cap means 52, connecting arm 70 and ratchet mate means 72 have rotated about hinge 60 thereby allowing charcoal to flow downward as denoted by arrow C. Swinging ratchet 66 retains ratchet mate means 72 due to complemental fitting of the ratchet about the ratchet mate means to permit charcoal to flow downward. To stop flow of charcoal, an operator swings the ratchet in the direction denoted by arrow I. This releases ratchet mate means 72 and, since the ratchet mate means is preferably constructed of sufficient mass to more than counter balance plate means 38g and sealing cap means 32, ratchet mate means 72 and connecting arm 70 swing clockwise about hinge means 60, as shown by arrow H. This results in sealing cap means 52 rotating in the clockwise direction about hinge means 60 as shown by arrows F, thereby returning the sealing cap means and second plate means 38g to the position shown in FIG. 14, placing the apparatus in the second or closed position. To permit charcoal to flow an operator merely need grasp ratchet mate means 72 and swing it in a direction opposite that shown by arrow H in FIG. 15 until it engages swinging ratchet 66 and is retained thereby.

Recitation of typical dimensions will enable those of skill in the art to better understand the present invention. Typical hole diameters and spacings which have been used for hole means 11 are $\frac{1}{2}$ inch, $\frac{3}{4}$ inch, and 1 inch diameter sizes with such holes being spaced with center spacings in the neighborhood of 5 and $\frac{1}{4}$ inches. The screens or distribution means 16 have generally been 4 × 4 mesh hardware cloth corresponding to ASTM standards where 4 × 4 mesh denotes hardware cloth with strands spaced every $\frac{1}{4}$ inch. The preferred charcoal filled with this apparatus is mesh size 8 × 16. This charcoal can pass freely through a mesh having 8 strands per inch but is blocked by mesh having 16 strands per inch. Filter cells which have been filled have typically been in the neighborhood of 2 inches wide, as shown by dimension X in FIG. 4, by up to 5 feet in length. Also, filter cells up to 6 and even 8 inches in width have been filled using appropriately sized apparatus of the present invention. Typically, distribution means 16 are spaced vertically, as shown by dimensional letter B in FIG. 1, on the order of 3 to 4 inches, with 3 and $\frac{1}{2}$ inches being a preferred dimension. Where a 2 inch width filter cell has been filled, typically only a single row of holes has been utilized in the metering means while where a six inch width filter cell has been filled, the metering means has had two rows of $\frac{1}{2}$ inch holes spaced on approximately 3 and $\frac{1}{2}$ inch centers, with the two rows centered over the filter cells and spaced three inches apart. These are typical dimensions and in no way limit the scope of the present invention. Indeed, the scope of the present invention is to be construed solely by the appended claims when read in light of this specification and the attached drawings.

We claim the following:

1. A method, for filling a longitudinally extending vertically oriented filter cell, with a uniformly packed density of granular adsorbent material whereby subsequent gas flow through said filled cell is uniform across the cell face, comprising the steps of:
   a. positioning a longitudinally extending openable bottom portion of a reservoir of granular adsorbent material above a longitudinally extending apex orifice of an empty vertically oriented filter cell;

b. aligning a first open end of a longitudinally elongated collimating conduit with said reservoir openable bottom portion and aligning a second open end of said conduit with said longitudinally extending apex orifice of said filter cell;

c. interposing at least one longitudinally extending planar mesh within said conduit and perpendicular to a collimating wall thereof, intermediate said openable portion of said reservoir and said filter cell apex orifice;

d. opening said reservoir bottom portion thereby dispensing a downward flow of granular adsorbent material therefrom through said collimating conduit and said meshes and into said filter cell apex orifice; and e. removing said reservoir from above said cell thereby halting downward flow of granular adsorbent material into said cell when said cell is filled.

2. The method of claim 1 wherein said reservoir openable portion is a planar plate at the bottom of said reservoir of area at least as great as said apex orifice of said cell, said plate having a plurality of symmetrically spaced holes for flow of granular material therethrough out of said reservoir, wherein said reservoir includes means for optionally selectably opening and closing said holes.

3. The method of claim 1 wherein said planar meshes and said bottom plate of said reservoir are parallel.

4. The method of claim 1 wherein step (c) further comprises interposing two planar meshes parallel and spaced apart from one another, within said conduit and perpendicular to a collimating wall thereof, intermediate said openable portion of said reservoir and said filter cell apex orifice.

5. The method of claim 3 wherein diameter of said holes is from about ½ inch to about 1 inch.

6. The method of claim 4 wherein said planar meshes are horizontal and are separated by a distance of between about 3 inches and about 4 inches.

7. The method of claim 6 wherein said meshes are 4×4 mesh.

8. The method of claim 2 wherein opening said reservoir further comprises displacing a perforate plate from a position at which solid portions of said perforate plate occlude said holes of said reservoir planar bottom plate to a position at which said reservoir planar bottom plate holes communicate with said perforations of said displaceable perforate plate.

9. The method of claim 2 wherein opening said reservoir further comprises removing from said reservoir planar bottom plate, means for occluding said reservoir planar bottom plate holes, to a position out of a downward flow path of granular adsorbent material from said reservoir.

* * * * *